March 11, 1952 — D. M. SMITH — 2,589,154

PISTON RING

Filed Oct. 2, 1947

INVENTOR:
DALLAS M. SMITH
BY
ATTORNEYS.

Patented Mar. 11, 1952

2,589,154

UNITED STATES PATENT OFFICE 2,589,154

PISTON RING

Dallas M. Smith, Kirkwood, Mo., assignor to Mc-Quay-Norris Manufacturing Company, St. Louis, Mo., a corporation of Delaware Application October 2, 1947, Serial No. 777,541

6 Claims. (Cl. 309—45)

1

This invention relates generally to piston rings for internal combustion engines and particularly to replacement piston ring sets.

After an internal combustion engine has been subjected to long and hard uses, it is frequently necessary to install new piston rings in the old piston. Generally, due to the worn condition of the cylinder at the time of such piston ring replacement, it is desirable to utilize a piston ring combination, which includes an expander spring, in order to assure adequate unit pressure of the ring against the worn cylinder of the engine. Such rings and their expanders are generally designed for use in piston ring grooves of specified standard depths, so that, when the expander spring is seated upon the bottom of the piston ring groove, the piston ring will be forced outwardly into contact with the cylinder under pressures for which the piston ring and its expander were designed.

Despite the careful design and test-proof which the piston ring manufacturer has conducted, and, despite specific instructions which accompany the sale of such rings as to the ring groove depth in which the piston ring set is to be utilized, it is not uncommon that such rings are installed by mechanics in grooves for which they were not intended. When, in such cases, the ring is installed in a groove of greater depth than that for which it was designed, the pressure exerted by the expander spring is considerably below that which is expected of it, and consequently unsatisfactory operating results are obtained. Piston ring grooves which are worn may vary in depth about the circumference of the piston, though only for a few thousandths of an inch, but this variation is reflected in non-uniform unit pressures about the circumference of the piston ring.

The object of the present invention, generally stated, is to provide a piston ring set, including an expander spring, which does not depend upon the bottom of the piston ring groove to receive the reaction of the expander spring.

Other objects will become apparent to those skilled in the art when the following description is read in connection with the accompanying drawings, in which.

Figure 1:
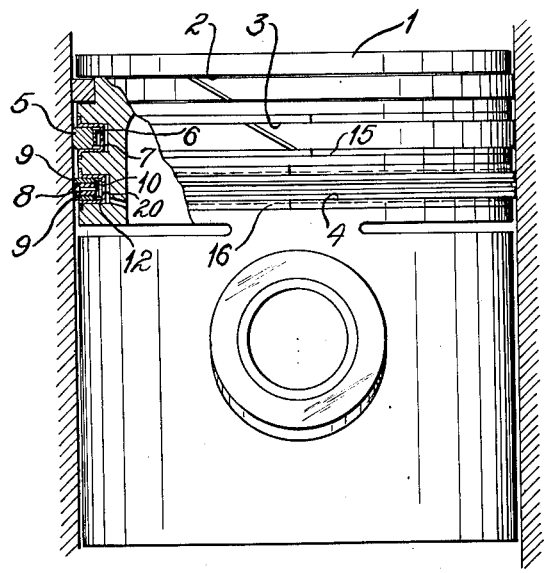
Figure 1 is a view in side elevation, part being shown in section, of a piston provided with piston ring sets constructed in accordance with the present invention.

In accordance with the present invention, a piston ring combination, which includes an expander spring of the character requiring a part to sustain radial reaction, is provided and located

2 in a piston ring groove without reference to, and without reliance upon, the bottom of the piston ring groove. This is accomplished by providing a separate member for receiving the radially inward reaction of the expander spring and transmitting the same to a part of the piston other than the bottom of the ring groove. In the practical embodiment hereinafter disclosed in detail, such a reaction-receiving member is located with reference to the side walls of the piston ring groove and transmits the reaction of the expander spring to the piston adjacent the side walls of the groove.

Referring now to the drawings for a detailed disclosure of the piston ring of the present invention, the piston 1 is typical of any of a great variety of piston structures common in the art, with any of which the ring combinations of this invention may be utilized with equal effect. The piston 1 is provided with three ring grooves 2, 3, and 4.

In ring grooves 3 and 4, piston ring combinations of the character contemplated by this invention are shown.

In ring groove 3, the ring combination involves a cylinder-engaging ring 5 biased outwardly by an expander spring 6, which may be of any suitable radially-operating type. The reaction exerted by the expander spring 6 is received by a cage 7 and transmitted thereby to the piston structure adjacent the side walls of groove 3 in a manner which will be described more in detail hereinafter.

In ring groove 4, the piston ring combination differs from that shown in ring groove 3 with reference to the parts which engage the cylinder wall. Such cylinder-engaging parts, in this case, involve a cast iron spacer 8 and two thin steel segments 9, which per se is a piston ring structure well known in the art. The cylinder-engaging elements 8 and 9 are biased outwardly by an expander spring 10 provided with ventilations 11. A cage 12, comparable to that utilized in groove 3, is likewise provided. Cage 12 differs from cage 7 in the embodiment disclosed in that cage 12 is provided with oil vents because it is installed in the oil ring groove of the piston, whereas the cage 7 need not necessarily be provided with such ventilations, though it will be understood that, in an unventilated ring groove, such as 3, it is immaterial whether the cage 7 is provided with ventilations or not.

Figure 2:
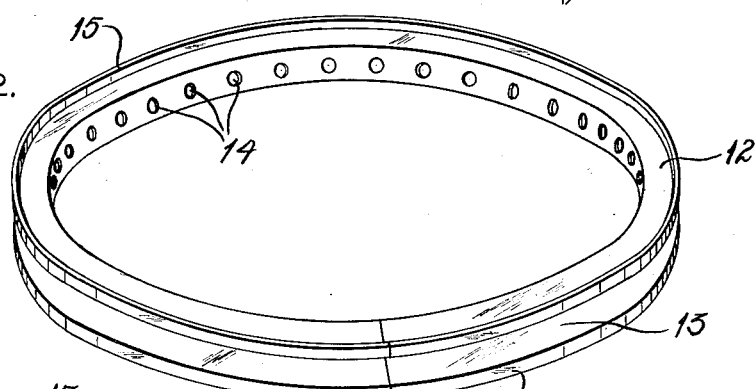
Figure 2 is a perspective view of an expander spring reaction-receiving member constructed in accordance with the present invention.

The cage member which receives the reaction of the expander spring, in accordance with the present invention, is shown in detail in Figure 2 and involves an annular channel 13 open at its exterior periphery. The channel 13 is proportioned to accommodate the cylinder-engaging ring (which may be of any desirable type), as well as the expander (which may be of any of a variety of forms). In the embodiment illustrated, the cage 12 is provided at its inner periphery, or bottom, with a succession of ventilating openings 14. At the exterior periphery of the cage member 12, a flange 15 extends axially upward and a comparable flange 16 extends axially downward. In the embodiment illustrated, flanges 15 and 16 are continuous throughout the periphery of the cage, but such may be discontinuous or, in fact, may be dispensed with as an integral part of the cage provided some alternative for limiting the radially inward movement of the cage relative to the ring groove (but not the bottom thereof) be utilized. For example, the cage may be pinned to the side walls of the ring groove.

Figure 3:
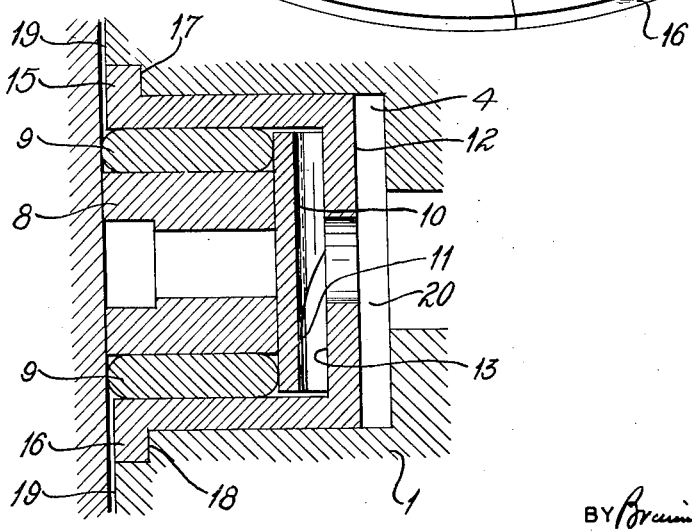
Figure 3 is an enlarged sectional view of the ring combination shown in the bottom groove of the piston shown in Figure 1.

In the process of installing the ring combinations of the present invention, the conventional piston is operated upon so as to provide an interlocking part for limiting the inward movement of the cage. In the form shown in Figure 3, the piston 1 is machined adjacent the mouth of ring groove 4 to provide thereat rabbets 17 and 18 for accommodating the flanges 15 and 16, respectively. The rabbets 17 and 18 are machined to a depth such that the exterior surfaces of the flanges 15 and 16 are preferably flush with the lands 19 of the piston. Having provided the rabbets and installed the cage 12 with its flanges 15 and 16 seated in the rabbets 17 and 18, as shown in Figure 3, the bottom of the cage 12 provides a seat for the expander 10, receives the radially inward reaction of the latter, and transmits the same to the body of the piston adjacent the ring groove 4. Consequently, the force of the expander spring urges the cylinder-engaging rings 8 and 9 radially outward relative to the piston with a predetermined unit pressure irrespective of the depth of the ring groove in which the combination is installed.

In the usual case, a clearance 20 will exist behind the cage 12 and the bottom of the ring groove. The magnitude of such clearance is not important and may, in fact, vary about the circumference of the piston, as pointed out above.

The provision of a member for receiving the reaction of the expander spring and transmitting the same to the piston, other than through the bottom of the ring groove, assures that such ring combinations will be productive, in the field, of unit pressures within the range for which the particular ring combination was designed to operate. Moreover, such an arrangement substantially eliminates circumferential variation in ring pressures in any given situation.

From the foregoing description, those skilled in the art should readily understand the construction, application, and advantages of the present invention. While a complete disclosure of one embodiment has been given and substituents suggested, it is not to be understood that the invention is limited to the particular forms or variations hereinbefore indicated. It is realized that those skilled in the art may readily vary the form of the several elements of the ring combination herein contemplated without departing from the spirit of the invention and consequently it is to be distinctly understood that such modifications and variations are contemplated by and within the scope of the appended claims.

Having thus described the invention, what is claimed and desired to be secured by Letters Patent is:

1. The combination with an internal combustion engine piston having a ring groove, of a piston ring assembly comprising, a cage disposed in the groove free of the bottom thereof, means limiting the radially inward position of said cage within the groove, a cylinder-engaging ring in the cage, and an expander spring disposed to urge the ring outwardly relative to the cage.

2. The combination with an internal combustion engine piston having a ring groove, of a piston ring assembly comprising, a cage disposed in the groove free of the bottom thereof, said cage having flanges extending axially opposite at the outer periphery thereof, the ring groove of said piston being relieved to accommodate said flanges and to limit the radially inward movement of the cage relative to the piston, a cylinder-engaging ring in the cage, and an expander spring disposed to urge the ring outwardly relative to the cage.

3. The combination with an internal combustion engine piston having a ring groove, of a piston ring assembly comprising, a cylinder-engaging ring, an expander spring free of the bottom of the groove arranged to urge said ring outwardly, and means free of the bottom of the ring groove for receiving the reaction of said expander spring, said means having a part engageable with the piston adjacent the exterior thereof to transmit the reaction of the expander spring to the piston.

4. A piston ring assembly for use with an internal combustion engine piston having a ring groove comprising, a cylinder-engaging ring, an expander spring, and means cooperating with the expander spring to sustain the reaction of the latter, said means having a part engageable with the piston adjacent the exterior thereof to transmit such reaction to the piston outwardly of the bottom of the ring groove.

5. A piston ring assembly for use with an internal combustion engine piston having a ring groove comprising, a cylinder-engaging ring, an expander spring, and a channel member arranged to accommodate said ring and said expander, said channel member providing a seat for said spring and having a part engageable with the piston adjacent the exterior thereof to transmit radially inward thrust from said member to the piston and to locate said member in spaced relation to the bottom of the ring groove.

6. A piston ring assembly for use with an internal combustion engine piston having a ring groove comprising, a cylinder-engaging ring, an expander spring, and an annular cage having an exteriorly open channel and flanges extending axially at the exterior periphery thereof to engage the piston and radially position the cage in the groove relative to the exterior of the piston, said channel being proportioned to accommodate the ring and spring.

DALLAS M. SMITH.

REFERENCES CITED

The following references are of record in the file of this patent:

UNITED STATES PATENTS

| Number | Name | Date |
|---|---|---|
| 1,195,305 | Werra | Aug. 22, 1916 |
| 1,381,047 | Woodland | June 7, 1921 |
| 1,755,673 | Solenberger | Apr. 22, 1930 |
| 1,781,207 | Wysong | Nov. 11, 1930 |
| 1,844,214 | Deutsch | Feb. 9, 1932 |
| 2,212,042 | Phillips | Aug. 20, 1940 |
| 2,272,631 | Bowers | Feb. 10, 1942 |
| 2,294,519 | Starr | Sept. 1, 1942 |
| 2,394,408 | Starr | Feb. 5, 1946 |